3,277,694
VISCOMETER
Michael R. Cannon, deceased, late of Boalsburg, Pa., by Elizabeth L. Cannon, executrix, Boalsburg, Pa., and Robert E. Manning, Boalsburg, Pa., assignors to Cannon Instrument Company, Boalsburg, Pa., a corporation of Pennsylvania
Filed Aug. 20, 1965, Ser. No. 487,956
2 Claims. (Cl. 73—55)

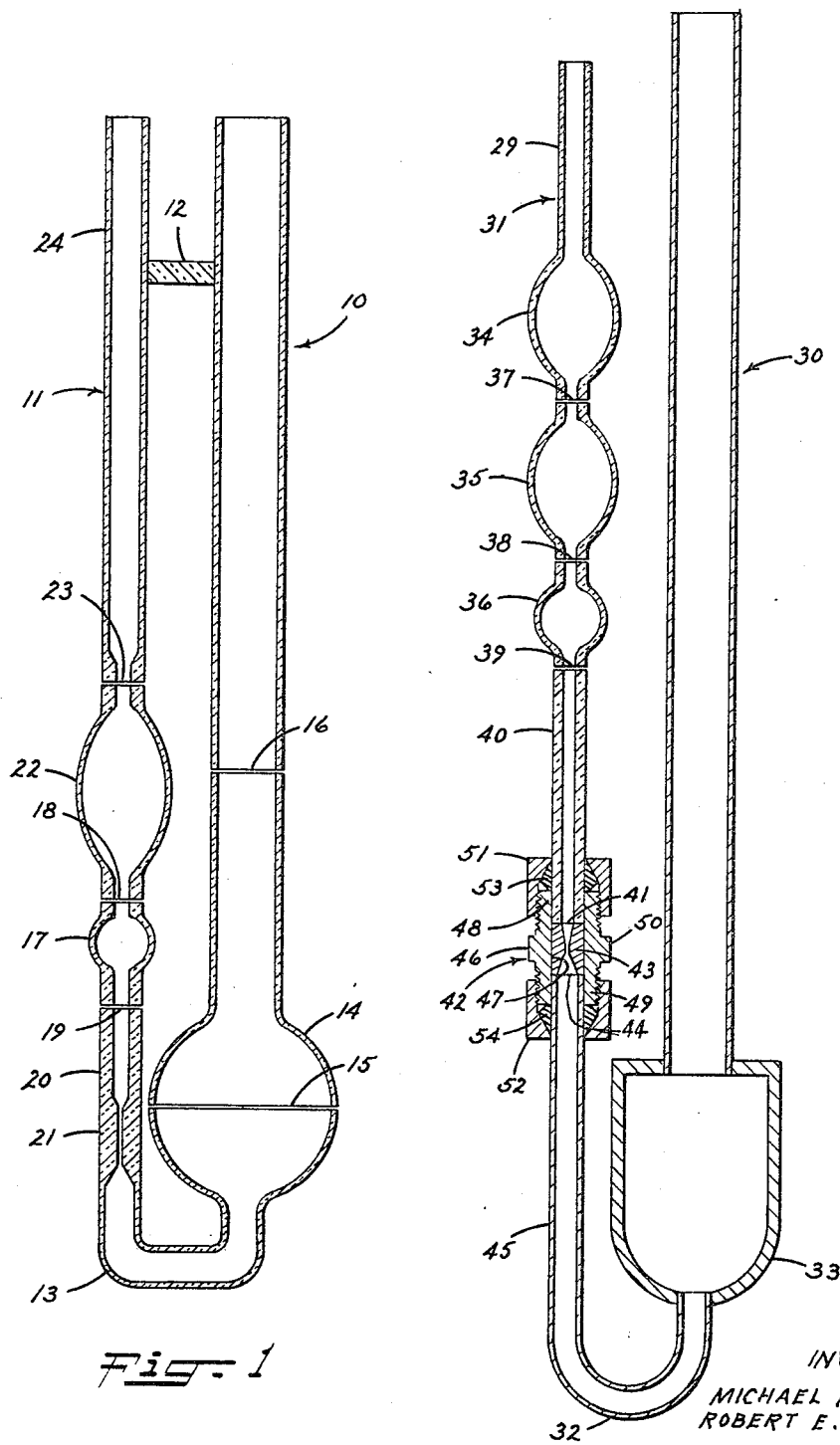

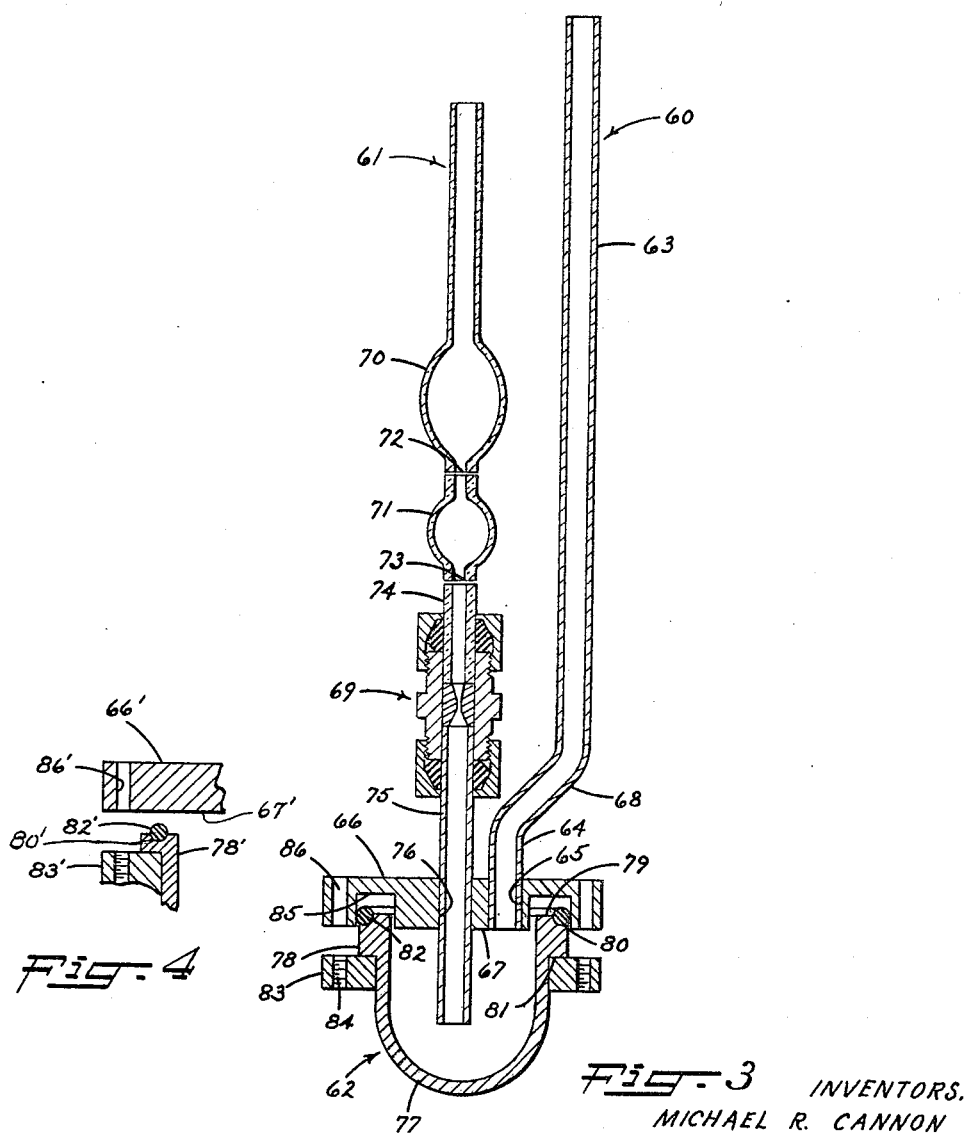

This invention is a continuation-in-part of copending application Ser. No. 146,750, filed October 23, 1961, now abandoned.

This invention relates to capillary viscometers for measuring the viscosity of materials, and particularly to pressure- or non-gravity-driven capillary viscometers for measuring absolute viscosity directly. As is known, viscosity is measured in instruments of this type by measuring the time for a fixed volume of test liquid to flow through the capillary. The time of flow is proportional to the viscosity, and the latter may be obtained by aid of a conventional equation.

Essentially the invention comprises a viscometer having a timing vessel and a capillary disposed in a path of flow through which a test material is adapted to be moved and wherein the length of the capillary is only a small proportion, preferably 0.8 to 20%, of the length of the path of flow.

Heretofore, in conventional capillary viscometers, long capillaries have been considered essential in order that flow time may vary directly with viscosity. For example, capillary lengths have ranged from 7 to 50 cm. and more for viscometers having overall lengths of 24 to 63 cm.; on the basis of path of flow, the capillary length has ranged from 60 to 80%. When high shear data are required, these long capillary lengths have involved the use of high pressures to drive the test material through the capillary, such as pressures on the order of 2000 p.s.i. but also extending from 1000 to 10,000 p.s.i. In turn, special precautions were necessary to design and construct the viscometers of a strength adequate to withstand the pressure, and thus the cost went up. Higher pressures also meant higher temperature increases in the test material owing to friction, thereby greatly affecting the accuracy of the test data and rendering correction more difficult.

By the light of past difficulties, the invention provides real and substantial advantages. Shortening of the capillary length to very small distances, as described, has been found to give reliable test data, in contrast to the long-held concept that long capillaries were necessary. Lower applied pressures are possible, enabling the instruments to be made of simplified design and construction, and therefore lower in cost; lower temperatures are induced in the test material, with accompanying greater accuracy and more easily applied corrections. In some cases, the viscometers can be constructed entirely of glass to provide reliable inexpensive instruments. High viscosity materials are more easily and accurately tested at high shear rates because the lower pressure required produces less heat effect in the test fluid.

The invention may be better understood by referring to the accompanying drawings wherein selected embodiments are shown and wherein FIG. 1 is a longitudinal view of a viscometer made in accordance with the invention;

FIGS. 2 and 3 are views like FIG. 1 but showing modifications; and

FIG. 4 is a fragmental view, in section, of another modification.

In FIG. 1 there is shown a transparent all-glass instrument comprising a U-shaped tube having open-ended branches 10 and 11 connected by glass rigidifying and strengthening brace 12 and the U-bend 13. Brace 12 may be positioned as desired, preferably being sufficiently spaced from the viscometer top to allow room for making connections, etc. A reservoir 14 having a filling mark 15 is located in the lower portion of branch 10, and a second filling mark 16 is disposed intermediate reservoir 14 and the upper end of branch 10. Branch 11 is provided with a timing bulb or vessel 17 of convenient size, ranging from 0.2 to 2.0 cc., having upper and lower timing marks 18 and 19. As will be seen, mark 19 is the inlet timing mark and mark 18 the outlet mark. Spaced from bulk 17 by a length of thick-walled tube 20 is a capillary 21 which communicates with the U-bend 13. The capillary has a gradually tapered or trumpet-shaped entrance and exit, but may have other suitable shapes for these portions, as is true of the other modifications. A second timing bulb 22 is located above vessel 17 and may be filled by the aid of timing marks 18 and 23. Tube 24, open at its upper end, connects bulb 22 to atmosphere or vacuum.

Capillary 21 may have a length as low as 0.01 or 0.02 cm. and as high as 3 or 4 cm., preferably a length in the range of 0.3 to 1 or 2 cm. In terms of path of flow, which extends from filling mark 15 to timing mark 18, when bulb 17 is in operation, the capillary length comprises 0.1 to 20% of the length of the path of flow, preferably 3 to 10%. As will become apparent, the path of flow between marks 15 and 18 is the entire path along which liquid moves during a timing operation although its flow time is measured only as it flows between timing marks 19 and 18 when bulb 17 is in operation. Marks 15 and 18 thus define the path of flow, mark 15 indicating the start and mark 18 the end of such path. When bulb 22 is in operation, the path of flow extends from filling mark 15 to timing mark 23, and flow time is measured only as the liquid flows between marks 18 and 23, with the foregoing proportions still applicable. The overall length of the viscometer may conveniently range from about 20 to 60 cm., of which length the capillary length preferably comprises 1 to 6.8%, although it may range as low as 0.1 or even 0.05% and as high as 9 or 10%. The diameter of the capillary, of course, is variable, but may range from 0.1 to 5 or 6 mm. Other suitable dimensions, which are not to be construed as limiting, are: 10 to 15 mm. O.D. for the diameter of branch 10; 8 to 10 mm. for the diameter of branch 11; 3 to 50 cc. for the volume of reservoir 14; 6 to 15 cm. for the length of U-bend 13; 0.2 to 2.0 cc. for the volume of bulb 17; 0.6 to 6.0 cc. for the volume of bulb 22. The distance between the longitudinal axes of branches 10 and 11 may vary from 2.5 to 5.0 cm. It will be understood that in order to arrive at correctly proportioned devices, the low value of one range is to be associated with the low value of the other ranges, and this also applies to the high values and to the intermediate values.

The conventional capillary viscometers referred to above have all had capillary lengths longer than 6 cm.; and as indicated, the lengths have ranged from 60 to 80% of the path of flow; or from 30 to 80% of the overall length of the viscometer.

The instrument may be made of any suitable glass, such as borosilicate. Wall thicknesses are sufficient to provide a sturdy construction and suitably may vary with respect to one another in the relative manner shown.

Filling of the viscometer may be accomplished in two ways. The first comprises pouring the test liquid into branch 10 until the liquid level in reservoir 14 reaches the mark 15, whereupon the instrument is placed in a constant temperature bath. When equilibrium temperature is attained, a pressure differential is induced to cause the test liquid to flow from reservoir 14 through the capillary 21 into timing bulb 17; this may be brought about by connecting branch 11 to a source of vacuum while allowing branch 10 to remain open to atmosphere, or by connecting branch 10 to a pressure source higher than branch 11. Conventional vacuum and pressure sources and connections are suitable. By means of stop watches or other timing devices the time in seconds required to fill bulb 17 is measured by starting the timer when the meniscus of the test liquid reaches mark 19 and stopping it when the meniscus reaches mark 18. The time to fill bulb 22 is also measured by timing movement of the meniscus from mark 18 to mark 23. One can calculate absolute viscosity by means of the equation: $AV=Kt$, where AV is absolute viscosity in poises, K is the instrument calibration factor in poises per second, and $t$ is flow time in seconds. The test temperature and the applied vacuum or applied pressure are reported with the viscosity. An advantage of having bulbs 17 and 22 of different sizes is that if the fill time for bulb 17 is too small for the desired accuracy, then the larger bulb 22 is available to provide a longer and more accurate fill time. Additional timing bulbs may be provided to extend the viscosity and shear range of one instrument.

Pressure differentials in the range of 1 to 50 p.s.i.g. are suitable for operating the instrument, providing reliable test results and greater ease in making corrections.

The second way of filling the viscometer comprises turning it upside down and immersing the free end portion of branch 10 into the test liquid and then applying suction to the end of branch 11; in this way liquid is drawn up to the mark 16, then held there while the instrument is revolved to its normal vertical position, whereupon the liquid will flow into reservoir 14 to the level of mark 15. Subsequent procedure is the same as for the first filling method.

Considering the path of flow again briefly, it will be seen that mark 15 indicates the beginning of the path and mark 18 the end, when bulb 17 is in use. The entire charge of liquid moves for some distance along such path, during the course of a test, although the entire charge does not traverse the entire path. Flow time of only part of the liquid is measured over only a part of the path, namely, from marks 19 to 18. Thus, the path is the entire course along which the charge of liquid flows during the progress of a test or timed run, and it includes that part of the course through which flow time is measured. As described, the length of capillary 21 is only a small proportion of the length of the said path, namely 0.1 to 20% thereof.

In FIG. 2 the construction is partly of glass, and partly of metal or other suitable pressure resistant material. A U-shaped instrument is shown comprising two open-ended branches 30 and 31 connected by the U-bend 32. Tube 31 is shorter than tube 30 to allow room for making connections to the top of the latter tube. Branch 30 has a reservoir 33. Branch 31 has a plurality of bulbs 34, 35, and 36, the lower two being timing bulbs provided with timing marks 37, 38 and 39, while the uppermost bulb 34 serves to trap excess liquid at the end of a test while the operator is shutting off the pressure. A length of thick-walled tube 40 extends below the bulb 36 and terminates at end 41 disposed in the detachable capillary section generally designated as 42. Branch 31 comprising the components 34 to 40, and including the topmost length of tube 29, are of transparent glass; the remaining construction of the viscometer is preferably of metal or other pressure-resistant material. A separate short length of capillary tube 43 operatively abuts the end 41 of tube 40, and at its opposite or lower end the capillary operatively abuts the end 44 of the tube 45 which forms one arm of the U-bend 32. Capillary 43 is held in operative engagement with tubes 40 and 45 by means of a union 46 having upper and lower externally threaded portions 48 and 49 disposed on opposite sides of the annular rib 50. Centrally apertured, internally threaded, bored caps 51 and 52 are provided which threadedly engage portions 48 and 49 of the union to hold tubes 40 and 45 in abutting relation with the capillary. Seals 53 and 54 of conventional material help maintain the connection pressure tight. As is apparent, the capillary length 43 is removable and replaceable.

The capillary length, both in centimeters and in proportion to the path of flow, are like those described for FIG. 1.

To use the viscometer of FIG. 2, the branch 30 is charged with test liquid to fill the reservoir 33 to approximately three-fourths of its full capacity, as by pouring in a measured amount of liquid; then after equilibration, the desired pressure is applied to branch 30 to move the liquid through the capillary. Subsequent operation is like that described for FIG. 1. The viscometer is particularly useful where it is desired to employ higher pressures than are possible with an all-glass instrument. The pressure drop occurs over the short capillary 43 so that all of the glass portion of the instrument is under low pressure.

In FIG. 3, a glass and metal device is shown which is similar in a number of respects to that of FIG. 2 but which is provided with a detachable reservoir 62 by means of which it is charged with test material. The device comprises two branches 60 and 61, both open at their upper ends, and at their lower ends in communication with reservoir 62. Branch 60 comprises a straight tube 63 whose lower end portion 64 tightly engages an opening 65 in the cover 66 of the reservoir, the lower end being flush with the undersurface of the cover, as at 67. Tube 63 is suitably curved at 68 to enable it to clear the capillary construction generally indicated at 69. Branch 61 has a bulb 70, a timing bulb 71 provided with timing marks 72 and 73, and a length of thick-walled tube 74, all of which are of transparent glass, and all of which, together with the detachable capillary construction 69, are generally similar to the corresponding construction of FIG. 2 designated by reference numerals 34, 36, 38 and 39, 40 and 42. A thick-walled tube 75 extends downwardly from capillary section 69 and passes through opening 76 in cover 66 of reservoir 62. The reservoir comprises a round-bottomed bowl 77 having an outer annular shoulder or land on each side of the collar 78, the upper shoulder or groove being designated as 80 and the lower as 81. An O-ring 82 of suitable material, such as synthetic rubber or plastic is disposed in groove 80 and an annular ring 83 in groove or shoulder 81. Ring 83 has a series of circumferentially spaced threaded bolt holes 84. Cover 66 has an annular groove 85 in its underside for receiving the upper portion of bowl 77, including O-ring 82, and outwardly of such groove is a series of circumferentially spaced bolt holes 86 in alinement with the holes 84. Bowl 77 and cover 66 are adapted to be drawn tightly together by means of bolts passing through the upper and lower bolt holes, with the O-ring in bowl top edge 79 helping to provide pressure-tight sealing.

The capillary length is like that described for FIG. 1.

In FIG. 3, that part of branch 61 comprising bulbs 70 and 71, tube 74, and the tube extending above bulb 70, are of glass; the balance of the device is of metal with the exception of the sealing rings.

The instrument is charged by separating the bowl from the cover and adding test material to the bowl, a filling mark or groove (not shown) being machined on the inside of the bowl about one-fourth inch down from the top. After reassembly, pressure is applied through branch 60, causing test material to flow up through the capillary into the timing bulb. More than one timing bulb may be used, as will be understood. An advantage of the device is that disassembly is easily done for inspection. Another advantage is that test materials that are solid at room temperatures may be placed in the bowl in chunks or other solid form; these are then melted when the device is brought to operating temperature. The location of the capillary is variable to an extent;

thus it may be placed at the bottom end of tube 75 as well as at any intermediate portion thereof. As will be understood, the capillary may be removed and replaced by others of different sizes.

The viscometers are of value in determing viscosity of liquids over a range of 0.5 to 12 million centistokes at a wide range of shear rates. They are of particular merit in studying such materials as asphalt and lubricating oils (particularly at winter temperatures where cold weather starting ease, or difficulty, may be a function of both viscosity and shear rate). In addition, polymers and polymeric solutions may be investigated more fruitfully since the shear rate and viscosity data obtainable with these instruments are of high accuracy. The viscometers permit accurate study of non-Newtonian materials like greases, plastic materials, emulsions, paints, printing inks, starches, drilling muds, etc. A further advantage is apparent from the upward flow of the test liquid in the timing bulbs in that the leading edge of the meniscus is always clearly defined whether or not the liquid is opaque.

In FIG. 4, which represents a modification of FIG. 3 in respect of the seal between the bowl and the cover, the groove in the underside of the cover is omitted. Instead, the underside 67' of cover 66' is flat and is engageable by O-ring 82' which is disposed in the groove 80' centrally positioned in the top edge of collar 78'. When the bowl and cover are drawn together by bolts passing through openings 86' to engage the annular ring 83', the O-ring 82' is pressed tightly against the surface 67', providing an effective seal at lower pressures, say up to about 100 p.s.i.g.

Another area of importance and practical interest is the use of the viscometers to measure viscosities at various rates of shear, and conversely, the measurement of different shear rates of a given test material. Studies of this kind may be made by means of the equation:

$$\frac{dV}{dX} = \frac{Prg_c}{2Lm\mu}$$

where $$\frac{dV}{dX}$$

is the shear rate, P is the pressure, r is the capillary radius, $g_c$ is a constant (32.17 # mass×ft./# force×sec.²), L is the capillary length, and $m\mu$ is the absolute viscosity. Assuming that the viscosity of a given test liquid is determined in a given viscometer of the invention, this viscosity value can be used in the foregoing equation to determine shear rate because this equation states that for a fixed viscosity, and a fixed capillary radius, and a fixed pressure, the shear rate increases as L, the capillary length, decreases. Since the viscosity, capillary radius, capillary length, and applied pressure are known, the equation can be solved for shear rate. Stated another way, high shear rates can be obtained at relatively low applied pressures if L can be made very small. The significance of the present viscometers to the foregoing equation is that it is possible to get reliable test data at small capillary lengths. Furthermore, such data are obtainable at much lower applied pressures than heretofore possible, the applied pressure ranging from 0.1 to 500 p.s.i. as against pressures of up to 10,000 p.s.i. with conventional viscometers. The lower pressures mean that temperature increases, produced by friction in the test material, will be lower, and thus the accuracy of the data is improved. Lower operating pressures also result in less elaborate and less expensive instruments, and as indicated by the device of FIG. 1, glass instruments are useful where formerly a metal construction was required.

It will be understood that the viscometer is not limited to two spaced-apart arms. For example, a useful instrument is one having only the capillary-containing arm disposed in a reservoir in the form of a separate concentric tube which extends upwardly along and encloses the single capillary-containing arm and is open to atmosphere, suction being applied to the upper end of the arm.

The term "non-gravity flow," as may be used herein, refers to flow induced by means of added pressure or by use of applied vacuum, as distinct from gravity flow which occurs only by influence of gravity.

Although the invention has been described in connection with specific embodiments of the same, it is capable of obvious variations without departing from its scope.

In the light of the foregoing description, the following is claimed:

1. In an all-glass U-shaped pressure-driven capillary viscometer for the direct measurement of absolute viscosity comprising a pair of arms each open at the upper ends thereof and in communication with each other at their lower ends, a timing bulb in one arm, a length of capillary tube of 0.1 to 5 mm. internal diameter in said one arm below said bulb, a reservoir in the lower part of the other arm, and a tube connecting said reservoir and said capillary tube, the improvement comprising a second timing bulb disposed above and spaced from said first bulb and being of greater volume than said first bulb, said first timing bulb being connected to atmosphere through said second timing bulb, said capillary tube being spaced from said first timing bulb by a length of thick-walled tube, the path of flow of liquid whose viscosity is to be measured comprising said reservoir, connecting tube, capillary tube, thick-walled tube, and first timing bulb; said path of flow being defined by a pair of marks one of which is on said reservoir to indicate the start of said path and the other of which is at the exit end of said first timing bulb to indicate the end of said path; and said length of capillary tube comprising only 0.1 to 20% of said path of flow.

2. In a U-shaped pressure-driven capillary viscometer for the direct measurement of absolute viscosity comprising a pair of arms open at the upper ends thereof and in communication with each other at their lower ends, the improvement wherein the upper part of one arm comprises a plurality of timing bulbs and a thick walled tube extending downwardly from the lowermost bulb, a separate replaceable length of capillary tube of 0.1 to 5 mm. internal diameter abutting the end of said thick-walled tube, the other arm being adapted to be placed under pressure, a reservoir in the lower portion of said other arm, a tube connecting said reservoir to the lower end of said capillary tube, the path of flow of test material whose viscosity is to be measured extending from said reservoir into said one arm and upwardly therein through the capillary tube and into a timing bulb, said path of flow being defined by a pair of marks one of which is on said reservoir to indicate the start of said path and the other of which is at the exit end of said last-mentioned bulb to indicate the end of said path, the length of said capillary tube being about 0.1 to 20% of the length of said path of flow, and means for removably holding the capillary tube in place between said thick-walled tube and said connecting tube.

References Cited by the Examiner

UNITED STATES PATENTS

| | | | |
|---|---|---|---|
| 1,467,461 | 9/1923 | Vogel | 73—55 |
| 2,805,570 | 9/1957 | Cannon | 73—55 |

OTHER REFERENCES

Greenwood et al.: "A New Capillary Viscometer," Journal of Scientific Instruments, volume 34, pages 288 and 289, July 1957.

LOUIS R. PRINCE, *Primary Examiner.*

DONALD O. WOODIEL, *Assistant Examiner.*